(12) United States Patent
Lee et al.

(10) Patent No.: US 8,236,269 B2
(45) Date of Patent: Aug. 7, 2012

(54) RIGID RANDOM COILS AND COMPOSITION COMPRISING THE SAME

(75) Inventors: Heon-Sang Lee, Daejeon (KR); Chang-Hun Yun, Daejeon (KR); Heon-Mo Kim, Seoul (KR)

(73) Assignee: LG Chem, Ltd., Seoul (KR)

( * ) Notice: Subject to any disclaimer, the term of this patent is extended or adjusted under 35 U.S.C. 154(b) by 763 days.

(21) Appl. No.: 11/674,485

(22) Filed: Feb. 13, 2007

(65) Prior Publication Data

US 2008/0004396 A1  Jan. 3, 2008

(30) Foreign Application Priority Data

Feb. 14, 2006 (KR) .................. 10-2006-0014326

(51) Int. Cl.
*C01B 31/00* (2006.01)
*C01B 31/02* (2006.01)

(52) U.S. Cl. .................. 423/445 R; 423/414; 428/371; 428/357; 428/364; 428/369; 524/495; 562/440

(58) Field of Classification Search ............. 524/495; 562/440; 428/371, 351, 364, 369; 423/414, 423/445 R
See application file for complete search history.

(56) References Cited

U.S. PATENT DOCUMENTS

| | | | | |
|---|---|---|---|---|
| 2002/0150524 | A1* | 10/2002 | Smalley et al. | 422/198 |
| 2004/0265212 | A1* | 12/2004 | Varadan et al. | 423/447.3 |
| 2005/0191490 | A1 | 9/2005 | Ton-That et al. | |
| 2007/0298669 | A1* | 12/2007 | Barrera et al. | 442/198 |

FOREIGN PATENT DOCUMENTS

| | | |
|---|---|---|
| JP | 1994280116 | 10/1994 |
| JP | 1996231210 | 9/1996 |
| JP | 2004123867 A | 4/2004 |
| JP | 2004244490 | 9/2004 |
| WO | 2005056645 A1 | 6/2005 |

OTHER PUBLICATIONS

J.S. Jeong, S.Y. Jeon, T.Y. Lee, J.H. Park, J.H. Shin, P.S. Alegaonkar, A.S. Berdinsky, J.B. Yoo; Fabrication of MWNTs/nylon conductive composite nanofibers by electrospinning, Oct. 12, 2006, Science Direct, Diamond and Related Materials, pp. 1839-1843.*
Lewis, Richard J. Sr., Hawley's Condensed Chemical Dictionary, 2002, John Wiley & Sons, 14th Edition, p. 891.*
Shaoming Yang, Xiquin Chen, Seji Motojima, Masaki Ichihara, "Morphology and microstructure of spring-like carbon micro-coils/nano-coils prepared by catalytic pyrolysis of acetylene using Fe-containing alloy catalysts," Dec. 2004, Science Direct, pp. 827-834.*
D. D Bernaerts, X.B. Zhang, X.F. Zhang, S.Amelinckx, G. Van Tendeloo and EMAT, "Coiled Carbon Nanotubes," Mar. 1994, International Winterschool on Electronic Properties of Novel Materials, p. 122-125.*
Kim et al., "Synthesis of Ultralong and High Percentage of Semiconducting Single-walled Carbon Nanotubes", 2002, Department of Chemistry, Stanford University, vol. 2, No. 7, pp. 703-708.*
Lijima, S.; "Helical microtubules of graphitic carbon"; Nature; vol. 357; pp. 56-58; Nov. 7, 1991.
Chen, et al.; "Mechanic of a Carbon Nanocoil"; Nano Letters; vol. 3, No. 9; pp. 1299-1304; 2003.
Scheraga, H.; "Non-Newtonian Viscosity of Solutions of Ellipsoidal Particles"; J. Chem. Phys.; vol. 23, No. 8; pp. 1526-1532; Aug. 1955.
European Search report issued Sep. 30, 2010; EP 07708596.7.

* cited by examiner

*Primary Examiner* — James J Seidleck
*Assistant Examiner* — Deve E Valdez
(74) *Attorney, Agent, or Firm* — McKenna Long & Aldridge LLP

(57) ABSTRACT

Disclosed are rigid random coils, having a contour length larger than a diameter thereof, an average bending ratio $D_b$ of 0.1~0.8, and a weight average molecular weight of $1 \times 10^8$~$9 \times 10^8$ g/mole, and a resin composition or organic solvent composition including the same. The rigid random coils have the properties intermediate between those of polymers and rigid rod particles, and thus may be used as filler of various resins, aqueous solutions or organic solvents.

12 Claims, 1 Drawing Sheet

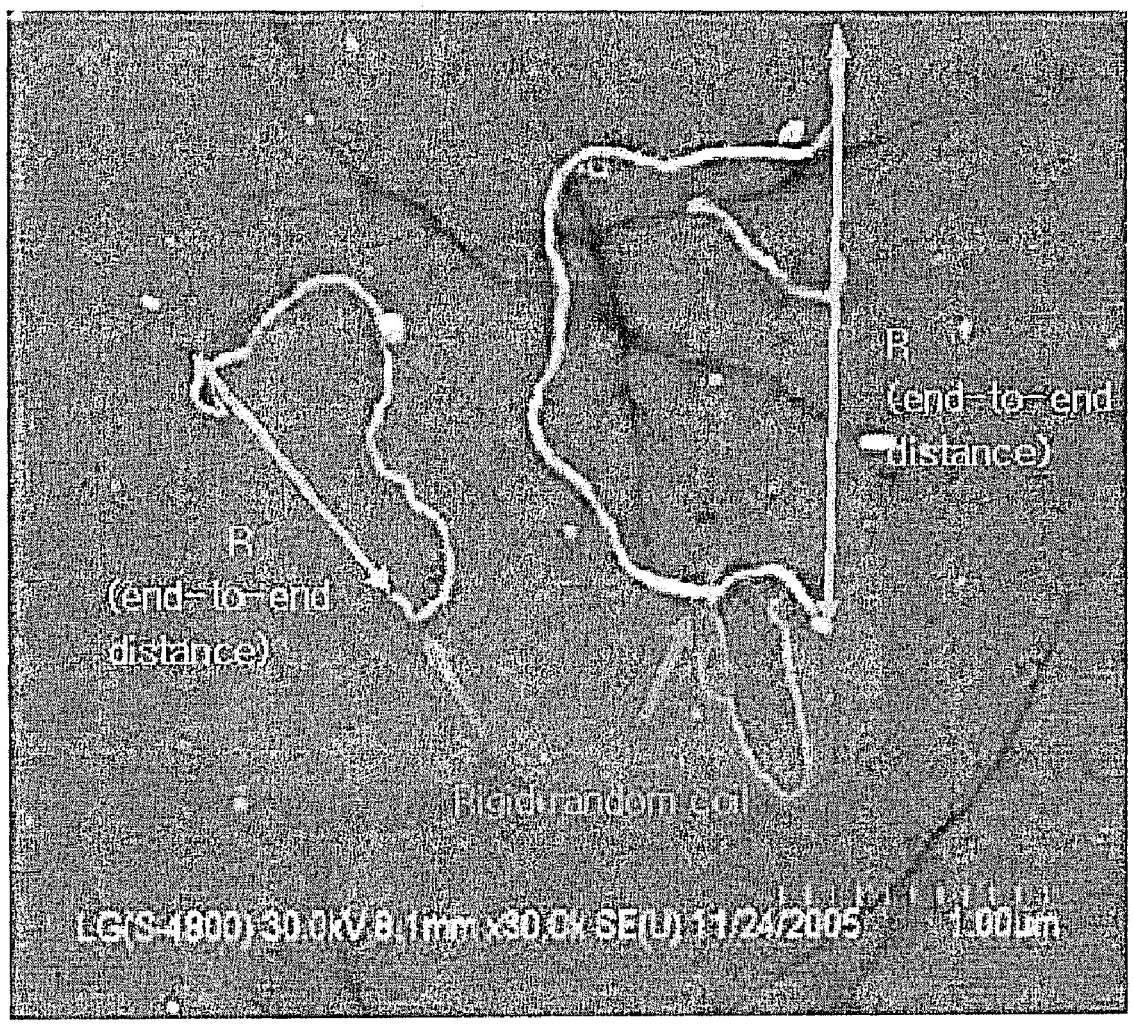

RIGID RANDOM COILS AND COMPOSITION COMPRISING THE SAME

This application claims the benefit of the filing date of Korean Patent Application No. 10-2006-0014326 filed on Feb. 14, 2006, in the Korean Intellectual Property Office, the disclosure of which is incorporated herein in its entirety by reference.

TECHNICAL FIELD

The present invention relates to rigid random coils and a composition comprising the same, and more particularly, to rigid random coils, having a contour length larger than the diameter thereof, an average bending ratio $D_b$ of 0.1~0.8, and a weight average molecular weight of $1 \times 10^8 \sim 9 \times 10^8$ g/mole, and to a resin composition or organic solvent composition comprising the same.

The rigid random coils of the present invention, having well-defined molecular weight and shape, can be mixed with an organic solvent or a polymer to thus serve as an electrically conductive coating agent, and further, can mitigate problems related to the anisotropy of conventional rod conductive filler, and therefore can be used as a filler or an additive in various organic solvents and polymers.

BACKGROUND ART

Generally, a widely known method of imparting electrically non-conductive resin with electrical conductivity uses a resin composition comprising conductive carbon black, carbon fiber, ceramic fiber, or metal fiber. Further, with the aim of reinforcing the strength of the resin, the use of carbon black, carbon fiber, ceramic fiber or metal fiber is preferable. Recently, attempts to realize resin compositions comprising nano-carbon fiber having a diameter of 500 nm or less have been made.

The carbon nanotube was invented in the year 1991 (Nature, 354, 56~58, 1991), and a method of synthesizing large amounts of carbon nanotubes is disclosed in Japanese Unexamined Patent Publication No. 1994-280116 (laid open on Oct. 4, 1994).

Japanese Unexamined Patent Publication No. 1996-231210 (laid-open on Sep. 10, 1996) discloses a method of separating and purifying carbon nanotubes depending on the difference in molecular weight, size, and electrical conductivity of the carbon nanotubes.

In addition, Japanese Unexamined Patent Publication No. 2004-244490 (laid open on Sep. 2, 2004) discloses a synthetic resin comprising 0.01 wt %~1 wt % of carbon nanotubes, and also provides a chemical method to increase compatibility between the carbon nanotubes and the resin.

Typically, the carbon nanotube is carbon in a tubular shape, having a diameter ranging from ones to tens of nm, and is classified into a single-walled carbon nanotube, a double-walled carbon nanotube, and a multi-walled carbon nanotube, depending on the number of graphene layers. Further, the electrical properties thereof vary in conjunction with the chirality of the graphene.

However, carbon is present in many various forms, and the properties thereof vary with the structure thereof. For example, in the case of nanofibers, nano-carbon coils having a helical structure with a diameter of a few nm have been reported (Nano Letters, 3, 1299-1304, 2003).

Thus, conventional carbon nanotubes are thoroughly studied with regard to the size of the diameter thereof. Further, with respect to the shape thereof, exemplary are rigid rods or helices. However, the rigid rod is disadvantageous because it is in a liquid crystal state at a specific concentration and thus undesirably undergoes phase separation, and also the strength thereof changes considerably according to its orientation.

Therefore, particles having a bendable shape, that is, a rigid random coil shape, and properties intermediate between those of flexible chain polymers and rigid rod particles, have been considered with the goal of mitigating the above problems. However, research thereon has not yet been conducted.

DISCLOSURE

Technical Problem

Accordingly, an object of the present invention is to provide particles that have a rigid random coil shape, and properties intermediate between those of flexible chain polymers and rigid rod particles, preferably carbon particles having a rigid random coil shape.

Another object of the present invention is to provide a method of preparing the rigid random coils.

A further object of the present invention is to provide a resin composition, an organic solution, or an aqueous solution, comprising the rigid random coils.

Technical Solution

According to the present invention, the rigid random coils, having a contour length larger than the diameter thereof, an average bending ratio $D_b$ of 0.1~0.8, as represented by Equation 1 below, and a weight average molecular weight of $1 \times 10^8 \sim 19 \times 10^8$ g/mole, are provided.

Advantageous Effects

As described hereinbefore, the present invention provides rigid random coils and a resin composition comprising the same. In the case where the rigid random coils according to the present invention are mixed with an organic solvent or a polymer and are thus used as an electrically conductive coating agent or plastic, isotropic material can be formed, unlike conventional rod conductive fillers. Further, in the case where the rigid random coils of the present invention serve as a reinforcing agent for plastics, they can be used as additives or fillers in various organic solvents and polymers because they mitigate problems related to the anisotropy of conventional rod reinforcing filler. In this way, the rigid random coils of the present invention are expected to be efficiently applied to related fields.

DESCRIPTION OF DRAWINGS

FIG. 1 is a scanning electron micrograph photograph illustrating the rigid random coils obtained in Example 1 of the present invention.

MODE FOR INVENTION

According to the present invention, the rigid random coils, having a contour length larger than the diameter thereof, an average bending ratio $D_b$ of 0.1~0.8, as represented by the following equation (1):

$$D_b = \frac{\langle R^2 \rangle}{N^2 b^2} \qquad (1)$$

wherein R is the end-to-end distance vector, N is the number of segments, b is the length of the segment, and Nb is the contour length, and a weight average molecular weight of $1 \times 10^8 \sim 9 \times 10^8$ g/mole, are provided.

When the bending ratio is less than 0.1, it is difficult to show electrical conductivity because the defect rate is high. Further, when the weight average molecular weight is less than $1 \times 10^8$ g/mole, it is difficult to exhibit electrical conductivity and rigidity in the rigid random coils when mixed with the resin. On the other hand, when the bending ratio exceeds 0.8, it is difficult to obtain isotropic material, attributable to excessive anisotropy. Also, when the weight average molecular weight exceeds $9 \times 10^8$ g/mole, particles become entangled with each other, and are thus difficult to uniformly disperse.

In the present invention, the rigid random coils are characterized in that they have a specific shape and molecular weight and thus have properties intermediate between those of flexible chain polymers and rigid rod particles.

That is, the rigid random coils of the present invention are bent through permanent deformation, and the distribution of the bending point is well defined. Further, the rigid random coils of the present invention are a new type of particle, unlike helical coils, flexibly bendable fibers, or polymers. In the present invention, a technique for discretely separating and dispersing the rigid random coils of the present invention while greatly mitigating the difference in the properties thereof according to the direction is provided.

To this end, the hydrodynamic radius, average diameter, molecular weight, bending ratio, and apparent density of the rigid random coils are statistically defined and analyzed.

The rigid random coils of the present invention have the properties intermediate between those of the flexible coils and the rigid rod particles. More particularly, the contour length is greater than the diameter thereof, and is preferably 10 times or more. The average bending ratio is less than 1, and is preferably 0.8 or less.

As such, if the contour length is equal to or smaller than the diameter thereof, the rigid random coil of the present invention can not be regarded as being a coil. Therefore, the contour length should be greater than the diameter, and the average bending ratio should be less than 1, in order to realize a bended shape.

In the flexible coils, properties exhibited when most of the polymers are in a solution state or a molten state, that is the ensemble average of the end-to-end distance vector to the second power is represented by the following equation (2);

$$\langle R^2 \rangle = \sum_{n=1}^{N} \langle r_n^2 \rangle = Nb^2 \tag{2}$$

wherein R is the end-to-end distance vector, r is the distance vector of a monomer, N is the degree of polymerization of a polymer, and b is the statistically defined monomer length.

Further, in the group of rigid random coils, the spatial average of the square end-to-end distance vector to the second power is represented by the following equation (3):

$$\langle R^2 \rangle = N^2 \sum_{i=1}^{k} \sum_{j=1}^{k} (\phi_i r_i) \cdot (\phi_j r_j) = N^2 b^2 D_b \tag{3}$$

wherein $D_b$ is the bending ratio, $$D_b = \sum_{i=1}^{k} \phi_i^2,$$

$\phi_i$ is the fraction of the segment ($\phi_i = N_i/N$) in the i direction, N is the number of segments, $r_i$ is the vector of which the length is b and the direction is i, and b is the statistical length of the segment. Thus, bN is the contour length L.

In the above equation (3), $D_b$ of the rigid random coil is larger than 1/N and is smaller than 1. In the case where $D_b$ is equal to 1/N, the equation (3) becomes the same as the equation (2), and thus the rigid random coils have properties similar to those of the flexible coils. On the other hand, in the case where $D_b$ is equal to 1, the end-to-end distance is the same as the contour length, and thus the rigid random coils have properties corresponding to those of the rigid rod particles.

The average bending ratio $D_b$ may be determined by experimentally measuring the contour length and the end-to-end distance according to the following equation (4):

$$D_b = \frac{\langle R^2 \rangle}{L^2} \tag{4}$$

wherein R is the end-to-end distance vector, and L is the contour length. The equation (4) can be derived from the equation (3). The contour length and the end-to-end distance may be measured through SEM, TEM, or AFM, and the average end-to-end distance may be measured through static light scattering.

Further, the radius of gyration is determined from the pair correlation function, as represented by the equation (5):

$$R_g^2 \langle R^2 \rangle / 12 = a^2/12 \tag{5}$$

wherein a is the axial length of the rigid rod, which is the same as the end-to-end distance of the rigid random coil. If the rigid random coil is slightly flexible, the radius of gyration $R_g$ is represented by the following equation (6):

$$R_g^2 = a^2 D_c/6 \tag{6}$$

wherein a is the axial length of the rigid rod, which is the same as the end-to-end distance, as defined in the equation (5), and $D_c$ is, as the flexibility ratio, the persistence length times two divided by the length a. The flexibility ratio of the material is determined by the bending modulus, the outer diameter and inner diameter, and the change in the outer diameter and inner diameter in the axial direction. For example, in the case of multi-walled carbon nanotubes having an outer diameter of 18 nm, the flexibility ratio is measured to be about 0.21. The radius of gyration may be determined through static light scattering, X-ray scattering, and small angle neutron scattering.

Further, the intrinsic viscosity of the rigid random coil is represented by the following equation (7):

$$[\eta] = (N_{avo}/100)(V_H/\overline{M_w})\upsilon \tag{7}$$

wherein $N_{avo}$ is the Avogadro number, and $V_H$ is the equivalent hydrodynamic volume obtained from the Stokes-Einstein's correlation equation of the diffusion coefficient, which is determined by measuring the translational diffusion coefficient through dynamic light scattering. Further, $\upsilon$, the Simha factor, is the ratio of the axial length and the equatorial radius, in which the axial length is identical to the end-to-end distance, the equatorial radius being determined from the above equivalent hydrodynamic volume. The Simha factor is disclosed in J. Chem. Phys. Vol 23, 1526~1532 (1955), and may also be calculated from the following equation (8):

$$v = (J + K - L) \int F \sin^4\theta \sin^2 2\varphi d\Omega + L \int F \sin^2\theta d\Omega + \qquad (8)$$

$$M \int F \cos^2\theta d\Omega + \frac{N}{\alpha} \int F \sin^2\theta \sin 2\varphi d\Omega$$

wherein $$J = \frac{1}{aR_e^2} \frac{\alpha_o''}{2R_e^2 \alpha_o' \beta_o''}$$

$$K = \frac{1}{aR_e^2} \frac{1}{2R_e^2 \alpha_o''}$$

$$L = \frac{1}{aR_e^2} \frac{2}{\beta_o''(a^2 + R_e^2)}$$

$$M = \frac{1}{aR_e^2} \frac{1}{R_e^2 \alpha_o'}$$

$$N = \frac{6}{aR_e^2} \frac{a^2 - R_e^2}{a^2 \alpha_o + R_e^2 \beta_o}$$

$$\alpha_o = \frac{1}{R_e^3(p^2-1)} \left\{ -\frac{2}{p} - A \right\}$$

$$\beta_o = \frac{1}{R_e^3(p^2-1)} \left\{ p + \frac{A}{2} \right\}$$

$$\alpha_o' = \frac{p^4}{4a^3 R_e^2(p^2-1)^2} \left\{ (2p^2 - 5) - \frac{3A}{2p} \right\}$$

$$\beta_o' = \frac{2p^2}{a^3 R_e^2(p^2-1)^2} \left\{ 1 + \frac{p^2}{2} + \frac{3pA}{4} \right\}$$

$$\alpha_o'' = \frac{2p^2}{aR_e^2(p^2-1)^2} \left\{ \frac{p^2}{4} + \frac{1}{8} + \frac{4p^2-1}{16p} A \right\}$$

$$\beta_o'' = \frac{2p^2}{aR_e^2(p^2-1)^2} \left\{ -\frac{3}{2} - \frac{(2p^2+1)}{4p} A \right\}$$

$$A = \frac{1}{(p^2-1)^{1/2}} \ln \frac{p - (p^2-1)^{1/2}}{p + (p^2-1)^{1/2}}$$

The shape of the rigid random coil of the present invention is defined as the bending ratio of the equation (4). The shape and size of the rigid random coils may be determined not only using SEM, TEM or AFM but also using the following hydrodynamic process. The end-to-end distance in Equation 4 may be calculated by substituting the radius of gyration $R_g$, measured through static light scattering, into the equation (5) or (6). In addition, using the equivalent hydrodynamic radius measured through dynamic light scattering, the equatorial volume $$\left( V_H = \frac{4}{3}\pi a R_e^2 \right)$$

of the prolate ellipsoid is determined, and thus the sequatorial radius ($R_e$) is calculated. Further, using the calculated equatorial radius and the axial length a of the equation (5), the axial ratio $$\left( p = \frac{a}{R_e} \right)$$

is calculated, from which the Simha factor is determined. The intrinsic viscosity of the rigid random coil is measured, and the weight average molecular weight is determined from the equation (7) using the calculated Simha factor. The contour length may be determined through Atomic Simulation (Materials studio v4.0, Accerlrys, USA) using data of the weight average molecular weight, the interlayer spacing of 0.35 nm and the C—C bonding distance of 0.142 nm, obtained through TEM, and the average inner diameter and average outer diameter obtained through TEM. Furthermore, from the ratio between the end-to-end distance and the contour length, determined by the hydrodynamic method, the bending ratio may be determined. Consequently, the molecular weight and the bending ratio of the rigid random coils which are thus determined, coincide with the molecular weight and the bending ratio obtained by counting the SEM images.

The material for the rigid random coils of the present invention is not limited as long as it represents the specific shape and dynamic behaviors as mentioned above, and preferably comprises carbon or carbon nanotubes.

In addition, the present invention relates to a method of preparing the rigid random coils.

The method of preparing the rigid random coils comprises a first step of sonicating a multi-walled carbon nanotube aggregate or carbon fiber, a second step of adding strong acid to the product of the first step and then performing sonication, and a third step of adding a solvent to the product of the second step and performing sonication.

The first step is a process of sonicating the multi-walled carbon nanotubes or carbon fiber in order to increase reactivity with the strong acid to be added in the second step. The multi-walled carbon nanotube is preferably prepared by supporting a metal catalyst on ceramic powder and then performing chemical vapor deposition. The ceramic powder is exemplified by aluminum oxides or silicon oxides, and the metal catalyst preferably includes an Fe catalyst. Thus, it is preferred that the step of sonicating the multi-walled carbon nanotube or carbon fiber be performed at 20~60 W for 40~200 min using an emulsifier-containing aqueous solution or purified water.

The second step is a process of adding the strong acid to the product of the first step and performing sonication in order to cut and separate the carbon nanotube aggregate and dissolve the ceramic powder. Examples of the strong acid include, but are not limited to, nitric acid, hydrochloric acid, or sulfuric acid, and sonication is preferably conducted at 20~60 W for 40~200 min.

The third step is a process of adding the solvent to the product of the second step and performing sonication to realize dispersion in the solvent. Preferably, examples of the solvent include, but are not limited to, tetrahydrofuran (THF), $CHCl_3$, or dimethylformamide, and sonication is preferably conducted at 20~60 W for 40~200 min.

Also, the method of preparing the rigid random coils of the present invention preferably further comprises a fourth step of centrifuging the product of the third step to extract a portion, which is uniformly dispersed in the solution. The fourth step is a process of separating the rigid random coils from the product of the third step. To this end, centrifugation is performed for 10~60 min, thereby obtaining only the portion dispersed in the solution.

In addition, the present invention relates to a rigid random coil thin film, obtained by filtering the rigid random coils prepared using the above preparation method.

The random coil thin film may be obtained by filtering the rigid random coils, uniformly dispersed in the solvent or aqueous solution in the third step, using a ceramic or polymer filter having a pore size of 20~200 nm. The thickness of the random coil thin film ranges from 30 nm to 10 μm. The shape of the film is maintained using the van der Waals force of the rigid random coils, or alternatively is maintained by applying another polymer thin film. The random coil thin film of the present invention may also be used as a gas diffusion layer of the fuel cell. Further, since the random coil thin film is transparent and has electrical conductivity and electromagnetic blocking properties, it is suitable for use as transparent electromagnetic blocking material for touch panels, switches, or displays, such as LCDs or PDPs requiring such properties.

In addition, the present invention relates to a resin composition, an organic solution or an aqueous solution, comprising the rigid random coils.

The rigid random coils are preferably contained in the resin composition, the organic solution or the aqueous solution in an amount of 0.0001~30 wt %. When the amount is less than 0.0001 wt %, there are no additional effects. On the other hand, if the amount exceeds 30 wt %, the molding process is difficult to perform and the strength may be decreased.

The resin, which may comprise the rigid random coils of the present invention, includes both thermoplastic resin and thermosetting resin. Preferably, examples of the resin include, but are not limited to, one or more selected from the group consisting of polycarbonate, polybutylene terephthalate, polyethylene terephthalate, aromatic polyamide, polyamide, polystyrene, polyphenylenesulfide, thermotropic liquid crystalline polymers, polysulfone, polyetherimide, polyetheretherketone, polyarylate, polymethylmethylacrylate, polyvinylalcohol, polypropylene, polyethylene, polyacrylonitrile butadiene styrene copolymers, polytetramethyleneoxide-1,4-butanediol copolymers, styrene copolymers, fluorine resins, polyvinyl chloride, polyacrylonitrile, syndiotactic polystyrene, polynorbornene, epoxy resin, and phenol resin.

Examples of the organic solvent of the organic solution preferably include dimethylformamide (DMF), toluene, xylene, methylene chloride, n-hexane, dimethylsulfoxide, chloroform, tetrahydrofuran (THF), and hydrocarbon organic solvents. As the aqueous solution, aqueous solutions containing various emulsifiers are particularly useful.

According to the present invention, the rigid random coils, of which the molecular weight and shape are well defined, may be mixed with the organic solvent or polymer and thus used as an electrically conductive coating agent.

Further, in the case where the rigid random coils of the present invention are used as a reinforcing agent for plastics, they can mitigate problems related to the anisotropy of conventional rod reinforcing filler, for example, problems including mechanical strength, electrical/thermal conductivity, linear expansion coefficient, or shrinkage, and therefore can be used as an additive or filler in various organic solvents and polymers.

A better understanding of the present invention may be obtained through the following examples and comparative examples, which are set forth to illustrate, but are not to be construed as the limit of the present invention.

Example 1

Preparation of Rigid Random Coils and Thin Film 5 g of a multi-walled carbon nanotube aggregate (available from JEIO Co., Ltd.), obtained by supporting a metal (Fe) catalyst on ceramic powder (aluminum oxide) and then performing chemical vapor deposition, was added to 100 g of purified water, and then sonication was conducted at 40 W for 180 min. 50 g of 60% strong nitric acid was added thereto, and then sonication was performed at 40 W for 60 min, so that the aggregate was cut and separated and the ceramic powder was dissolved. Subsequently, the product was washed with purified water, added to 100 g of dimethylformamide, and then subjected to sonication at 40 W for 180 min. The sonicated solution was centrifuged, thus obtaining rigid random coils in the uniform solution, the bending ratio and the weight average molecular weight of which were measured to be 0.32 and $3.43 \times 10^8$ g/mole, respectively. The rigid random coils thus prepared were filtered, resulting in a thin film, the surface resistance of which was measured to be 50 Ohm or less.

Example 2

A uniform solution of dimethylformamide and rigid random coils, obtained as in Example 1, was mixed with polycarbonate dissolved in THF so that the rigid random coils were contained in an amount of 0.5 wt %, followed by film casting. The rigid random coils thus prepared were filtered to thus obtain a thin film 1 μm thick, the surface resistance of which was measured to be $10^{4~8}$ Ohm/sq.

Example 3

Carbon Fiber Rigid Random Coils

The present example was conducted in the same manner as in Example 1, with the exception that carbon fiber, rather than carbon nanotube, was used. Thus, the resultant rigid random coils had a contour length 20 times the diameter thereof, and a bending ratio of 0.4, corresponding to the properties of rigid random coils. The shape of the rigid random coils was not limited only to the tube as in Example 1.

Example 4

Preparation of Resin Composition Containing Rigid Random Coils 481.3 g of polycarbonate, as a thermoplastic resin, 15 g of the rigid random coils prepared in Example 1, 0.2 g of an antioxidant, 2.5 g of a lubricant, and 15 g of a phosphate-based flame retardant were loaded into a twin-screw extruder and mixed at 260° C. thus preparing a resin composition containing rigid random coils.

The surface resistance of the resin composition containing the rigid random coils was measured to be $10^{4~8}$ Ohm/sq, and the bending strength of the injection-molded test piece in a transverse direction, perpendicular to the mold direction, was determined to be 80~90% of the bending strength of 1200 kg/cm$^2$ in the mold direction (ASTM D790). Thereby, the difference in properties according to direction was confirmed to be very small. The mold shrinkage (ASTM D955) was 0.5% in a mold direction and 0.6% in a transverse direction, and thus differed by a factor of 1.2 according to the direction, resulting in superior isotropy.

Comparative Example 1

A uniform solution of dimethylformamide was prepared as in Example 1, with the exception that 5 g of rigid rod carbon nanotubes were used. The viscosity depending on the concentration was measured using an Ubbe-Lodde viscometer having a diameter of 0.36 mm.

The resultant product of Comparative Example 1 had a contour length of 3000 nm and an intrinsic viscosity of 14, and thus was confirmed to be a typical rod carbon nanotube without permanent deformation.

Comparative Example 2

481.3 g of polycarbonate, as a thermoplastic resin, 15 g of rigid rod carbon fiber, 0.2 g of an antioxidant, 2.5 g of a lubricant, and 15 g of a phosphate-based flame retardant were loaded into a twin-screw extruder and mixed at 260° C. thus preparing a resin composition containing the rigid rod carbon fiber.

The surface resistance of the resin composition containing the rigid rod carbon fiber was measured to be $10^{9\sim12}$ Ohm/sq, and the bending strength of the injection-molded test piece in a transverse direction perpendicular to the mold direction was determined to be 50~60% of the bending strength of 1300 kg/cm² in the mold direction (ASTM D790). Thereby, the difference in the properties according to the direction was confirmed to be large. The mold shrinkage (ASTM D955) was 0.3% in a mold direction and 0.6% in a transverse direction, and thus differed by a factor of 2.0 according to the direction.

INDUSTRIAL APPLICABILITY

As described hereinbefore, the present invention provides rigid random coils and a resin composition comprising the same. In the case where the rigid random coils according to the present invention are mixed with an organic solvent and a polymer and are thus used as an electrically conductive coating agent or plastic, isotropic material can be formed, unlike conventional rod conductive fillers. Further, in the case where the rigid random coils of the present invention serve as a reinforcing agent for plastics, they can be used as additives or fillers in various organic solvents and polymers because they mitigate problems related to the anisotropy of conventional rod reinforcing filler. In this way, the rigid random coils of the present invention are expected to be efficiently applied in related fields.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A rigid random coil that is formed by using carbon or a carbon nanotube,
    wherein the rigid random coil is bent through permanent deformation, the bending of the rigid random coil being defined by an average bending ratio $D_b$ of 0.1 to 0.8, as represented by the following equation (4):

$$D_b = \frac{\langle R^2 \rangle}{L^2} \quad (4)$$

wherein R is an end-to-end distance vector, and L is a contour length, the contour length being an end-to-end vector distance measured when said rigid random coil is contoured in the shape of a straight line,
    wherein the contour length is 10 times or more than the diameter of the rigid random coil, and
    wherein the rigid random coil has a weight average molecular weight of $1\times10^8$ to $9\times10^8$ g/mole.

2. A method of preparing a rigid random coil, comprising: a first step of sonicating a multi-walled carbon nanotube aggregate or carbon fiber; a second step of adding a strong acid to a product of the first step and performing sonication; a third step of adding a solvent to a product of the second step and performing sonication; a fourth step of centrifuging a product of the third step; and
    a fifth step of obtaining a rigid random coil of claim 1.

3. The method of claim 2, wherein the sonication in the first step to the third step is conducted at 20~60 W for 40~200 min.

4. The method of claim 2, wherein the strong acid is nitric acid, hydrochloric acid, or sulfuric acid.

5. The method of claim 2, wherein the solvent is tetrahydrofuran (THF), $CHCl_3$, or dimethylformamide.

6. A rigid random coil thin film, obtained by filtering a rigid random coil prepared by using the method of claim 2.

7. A resin composition, comprising 0.0001~30 wt % of the rigid random coil of claim 1.

8. The resin composition of claim 7, wherein the resin is one or more selected from the group consisting of polycarbonate, polybutylene terephthalate, polyethylene terephthalate, aromatic polyamide, polyamide, polystyrene, polyphenylenesulfide, thermotropic liquid crystalline polymers, polysulfone, polyetherimide, polyetheretherketone, polyarylate, polymethylmethylacrylate, polyvinylalcohol, polypropylene, polyethylene, polyacrylonitrile butadiene styrene copolymers, polytetramethyleneoxide-1,4-butanediol copolymers, styrene copolymers, fluorine resins, polyvinyl chloride, polyacrylonitrile, syndiotactic polystyrene, polynorbornene, epoxy resin, and phenol resin.

9. An organic solution, comprising 0.0001~30 wt % of the rigid random coil of claim 1.

10. The organic solution of claim 9, wherein a solvent of the organic solution comprises one or more selected from the group consisting of dimethylformamide (DMF), toluene, xylene, methylene chloride, n-hexane, dimethylsulfoxide, chloroform, tetrahydrofuran (THF), and hydrocarbon organic solvents.

11. An aqueous solution, comprising 0.0001~30 wt % of the rigid random coil of claim 1.

12. The aqueous solution of claim 11, which further comprises an emulsifier.

* * * * *